T. D. BRADY.
BELT-FASTENING.

No. 174,408. Patented March 7, 1876.

WITNESSES:
Chas Nida
Alex T. Roberts

INVENTOR:
T. D. Brady
BY
ATTORNEYS.

UNITED STATES PATENT OFFICE.

THOMAS D. BRADY, OF BALDWIN, PENNSYLVANIA.

IMPROVEMENT IN BELT-FASTENINGS.

Specification forming part of Letters Patent No. 174,408, dated March 7, 1876; application filed December 11, 1875.

*To all whom it may concern:*

Figure 1:
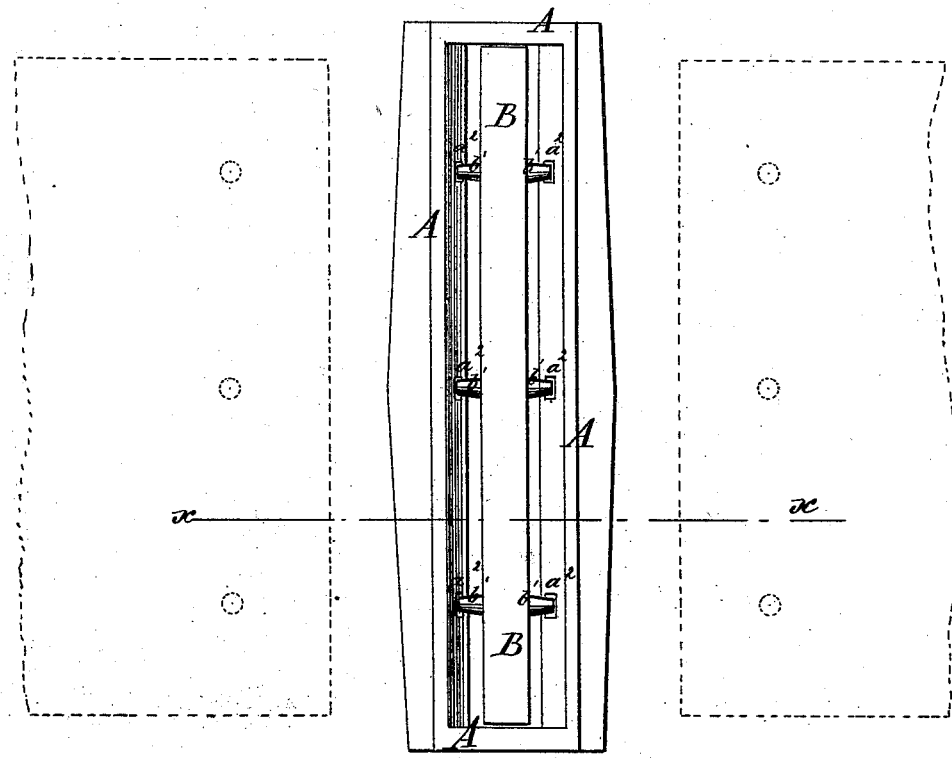
Figure 2:
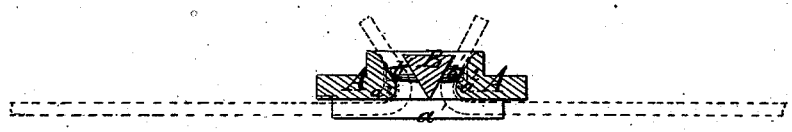
Figure 3:
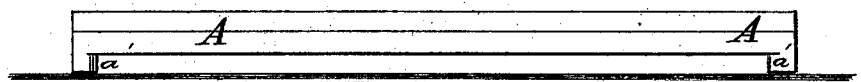

Be it known that I, THOMAS D. BRADY, of Baldwin, Butler county, Pennsylvania, have invented a new and Improved Belt-Coupling, of which the following is a specification:

Figure 1 is a top view of my improved coupling. Fig. 2 is a cross-section of the same, taken through the line $x\ x$, Fig. 1; and Fig. 3 is a side view of the same.

Similar letters of reference indicate corresponding parts.

The object of this invention is to furnish an improved device for connecting the ends of belts which shall be simple in construction, convenient in use, strong and durable, and easily attached to and detached from the belt.

The invention consists in an improved belt-coupling, formed by the combination of the frame, made with inclined inner sides, rounded lower corners, end flanges, and notches, and the triangular bar, provided with the pins, with each other, as hereinafter fully described.

A is the frame of the coupling, the slot or cavity of which is made of such a length as to equal the width of the belt. The inner surface of the sides of the frame A are beveled or inclined, and their lower corners are rounded off, as shown in Fig. 2. The lower parts of the side bars of the frame A are extended outward to rest upon the outer side of the belt. Upon the lower side of the ends of the frame A are formed cross-flanges $a^1$, for the edges of the belt to rest against to keep its end parts in line with each other. B is a V-shaped or triangular bar of such a length as to fit into the cavity of the frame A, and of a less width than the said cavity, so as to leave spaces between its sides and the sides of the said frame A, to receive the ends of the belt. Upon the sides of the bar B are formed, or to them are attached, three, more or less, pins or lugs, $b'$, the ends of which rest in notches $a^2$ in the inclined sides of the frame A, as shown in Figs. 1 and 2.

In using the coupling, holes, corresponding in number and position with the pins of the bar B, are formed in the ends of the belt, which ends are then passed through the cavity of the frame A. Their holes are passed over the pins $b'$, and the bar B is dropped into place in the cavity of the said frame A, which, as the belt is run upon the belt-wheel, will be drawn down to its seat, securely clamping the ends of the belt between its sides and the sides of the frame A.

The coupling thus constructed can be easily and quickly attached to or detached from the ends of the belt when required.

I am aware that a wedge with side studs supported on ledges of frame is not new; but the lugs on my coupling have no bearing when the belt is in the frame, the pin being left free, so as to allow the belt to be tightened to any degree. In the belt-tightener the buckle principle is employed. I avoid this, and bring no strain upon the pins. My coupling has its bearing on sides of frame, and has a bearing the full width of pin-piece, whether the belt is thick or thin; but by working the wedge-piece in the notches and bevel with frame, it cannot turn to either side.

I am also aware that a frame connected by two crow-bars has been used with a side-spiked wedge-bar, but it requires the ends of belt-sections to be slotted. This would defeat the object which I have in view—namely, to leave a surplus of perfect belting at each coupling, to provide for the shortening up by "breaks," and to leave no necessity for "piecing" at said breaks.

What I claim as my invention is—

The combination of a wedge-slotted frame, A, and wedge-shaped bar B, the former provided with notches $a^2$, to support side studs $b'$ of the latter, as and for the purpose specified.

THOMAS DICK BRADY.

Witnesses:
A. D. MEAD,
WILLIAM WALKER.